(12) United States Patent
Wilson

(10) Patent No.: US 10,953,519 B2
(45) Date of Patent: Mar. 23, 2021

(54) SEWER CAP REMOVAL SOCKET

(71) Applicant: David A. Wilson, Littleton, CO (US)

(72) Inventor: David A. Wilson, Littleton, CO (US)

( * ) Notice: Subject to any disclaimer, the term of this patent is extended or adjusted under 35 U.S.C. 154(b) by 0 days.

(21) Appl. No.: 16/657,227

(22) Filed: Oct. 18, 2019

(65) Prior Publication Data
US 2020/0298377 A1 Sep. 24, 2020

Related U.S. Application Data

(60) Provisional application No. 62/820,535, filed on Mar. 19, 2019.

(51) Int. Cl.
B25B 13/06 (2006.01)
B25B 23/00 (2006.01)
F16L 55/115 (2006.01)

(52) U.S. Cl.
CPC ........ B25B 13/065 (2013.01); B25B 23/0035 (2013.01); *F16L 55/1152* (2013.01)

(58) Field of Classification Search
CPC ....... B25B 13/06; B25B 13/065; B25B 13/48; B25B 23/0035; F16L 55/1152
See application file for complete search history.

(56) References Cited

U.S. PATENT DOCUMENTS

| 4,786,214 | A | | 11/1988 | Schmidt et al. | |
|---|---|---|---|---|---|
| 5,003,682 | A | | 4/1991 | Strausbaugh et al. | |
| 5,199,331 | A | * | 4/1993 | Tsukamoto | B25B 13/48 |
| | | | | | 81/121.1 |
| 6,269,717 | B1 | * | 8/2001 | Bollinger | B25B 13/06 |
| | | | | | 81/124.4 |
| 6,347,563 | B1 | * | 2/2002 | Witt | B25B 13/06 |
| | | | | | 81/121.1 |
| 7,036,402 | B1 | * | 5/2006 | Marks | B25B 13/48 |
| | | | | | 81/177.2 |
| 7,334,506 | B2 | * | 2/2008 | Hui | B25B 13/06 |
| | | | | | 81/124.4 |
| 7,562,605 | B2 | * | 7/2009 | Kunkel | B25B 13/02 |
| | | | | | 81/176.1 |
| 2002/0144572 | A1 | | 10/2002 | Chaves | |
| 2006/0265849 | A1 | | 11/2006 | Youngs | |
| 2007/0221016 | A1 | * | 9/2007 | Herbst | B25B 7/08 |
| | | | | | 81/415 |
| 2008/0041193 | A1 | * | 2/2008 | Baker | B25B 13/102 |
| | | | | | 81/124.6 |
| 2008/0121073 | A1 | * | 5/2008 | Williams | B25B 13/02 |
| | | | | | 81/121.1 |
| 2011/0203094 | A1 | | 8/2011 | Marciniak et al. | |
| 2014/0013905 | A1 | * | 1/2014 | Li | B25B 13/06 |
| | | | | | 81/124.4 |
| 2014/0251091 | A1 | * | 9/2014 | Hui | B25B 13/065 |
| | | | | | 81/124.4 |
| 2018/0207452 | A1 | * | 7/2018 | Fravor | A62B 3/005 |
| 2020/0282544 | A1 | * | 9/2020 | Barongan | B25B 23/16 |

* cited by examiner

*Primary Examiner* — David B. Thomas
(74) *Attorney, Agent, or Firm* — Boudwin Intellectual Property; Daniel Boudwin

(57) ABSTRACT

A sewer cap removal socket. The sewer cap removal socket includes a base plate. The base plate is defined by a first side oppositely disposed of a second side. An upper wall extends from the first side of the base plate. The upper wall forms a first interface. A lower wall extends from the second side of the base plate, opposite of the upper wall. The lower wall defines a second interface. An aperture is disposed in the base plate.

14 Claims, 4 Drawing Sheets

SEWER CAP REMOVAL SOCKET

CROSS REFERENCE TO RELATED APPLICATIONS

This application claims the benefit of U.S. Provisional Application No. 62/820,535 filed on Mar. 19, 2019. The above identified patent application is herein incorporated by reference in its entirety to provide continuity of disclosure.

BACKGROUND OF THE INVENTION

The present invention relates to a sewer cap removal socket. More specifically, the present invention provides a dual-interface sewer cap removal socket that can be used to efficiently and effectively remove sewer caps when required.

Sewer caps are utilized to seal off sewer pipes in both residential and commercial buildings. These caps typically are made of metal (such as cast-iron) or plastics (such as PVC). These caps are typically threaded so that they can be threadably engaged with a sewer line. As is common with threaded implements, these caps can become rusted, fused or otherwise adjoined with the sewer lines upon which they are mounted. This can make the removal of the sewer caps extremely difficult and frustrating, even for trained professionals.

Typically, when a sewer cap needs removed, an adjustable pair of water pump pliers are utilized. These pliers, however, tend to slip or slide off of the sewer cap. This slipping and sliding can result in costly damages to the sewer line and the sewer cap, particularly when the sewer caps were overtightened when previously removed or installed. Additionally, this slipping and sliding can be unsafe for the individual attempting to remove the sewer cap, as their fingers can be broken or dislocated with pressure being applied to the water pump pliers.

Adjustable pipe wrenches are also utilized to remove sewer caps from sewer lines. However, these adjustable pipe wrenches are exceptionally large and bulky, as well as heavy. In addition to the damage that can be inflicted upon the sewer cap and sewer line by these adjustable pipe wrenches, these instruments are also unusable when the sewer cap is placed into a hard to reach location, as an increased range of motion is required to applied adequate torque to the sewer cap.

Therefore, there is a defined need amongst the known art for a device that will assist a user in effectively and safely removing a sewer cap from a sewer line. Not only will such a device reduce the damage to the sewer cap, but it will also reduce the risk of personal injury to the user. By applying equally displaced torque to the sewer cap, the breakage risk is reduced. Traditional methods only apply torque to two places upon the sewer cap, increasing the breakage risk along the surface areas between these two points due to uneven pressure.

SUMMARY OF THE INVENTION

In view of the foregoing disadvantages inherent in the known types of methods for removing sewer caps from sewer lines now present in the known art, the present invention provides a sewer cap removal tool wherein the same can be utilized for providing convenience for the user when safely and effectively removing a sewer cap from a sewer line.

The present system comprises a base plate. The base plate includes a first side oppositely defined of a second side. An upper wall extends from the first side of the base plate. The upper wall defines a first interface. A lower wall extends from the second side of the base plate, opposite of the upper wall. The lower wall defines a second interface. An aperture is disposed in the base plate.

In one embodiment, the aperture further includes a socket interface. As such, the sewer cap removal socket can be engaged via a socket wrench.

In another embodiment, the aperture comprises an interface dimensioned to receive a breaker bar. As such, greater torque can be applied to the sewer cap removal tool.

In a further embodiment, the aperture comprises a socket integrally disposed in the aperture. As such, a socket wrench can be directed engaged with the sewer cap removal tool.

In yet another embodiment, the upper wall defines a larger perimeter or a smaller perimeter than the lower wall. As such, the sewer cap removal tool can be utilized on two differently sized sewer caps.

In yet a further embodiment, the upper wall and the lower wall are of a square shape having rounded corners. As such, the first interface and the second interface are ideal for engaging traditionally shaped sewer caps.

In another embodiment, the base plate, upper wall and lower wall are made of aluminum. As such, the sewer cap removal socket is light-weight and durable, increasing effectiveness and ease of use.

In a further embodiment, the base plate, upper wall and lower wall are powder coated. As such, the sewer cap removal socket can be more easily identifiable by a user when compared to other tools.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
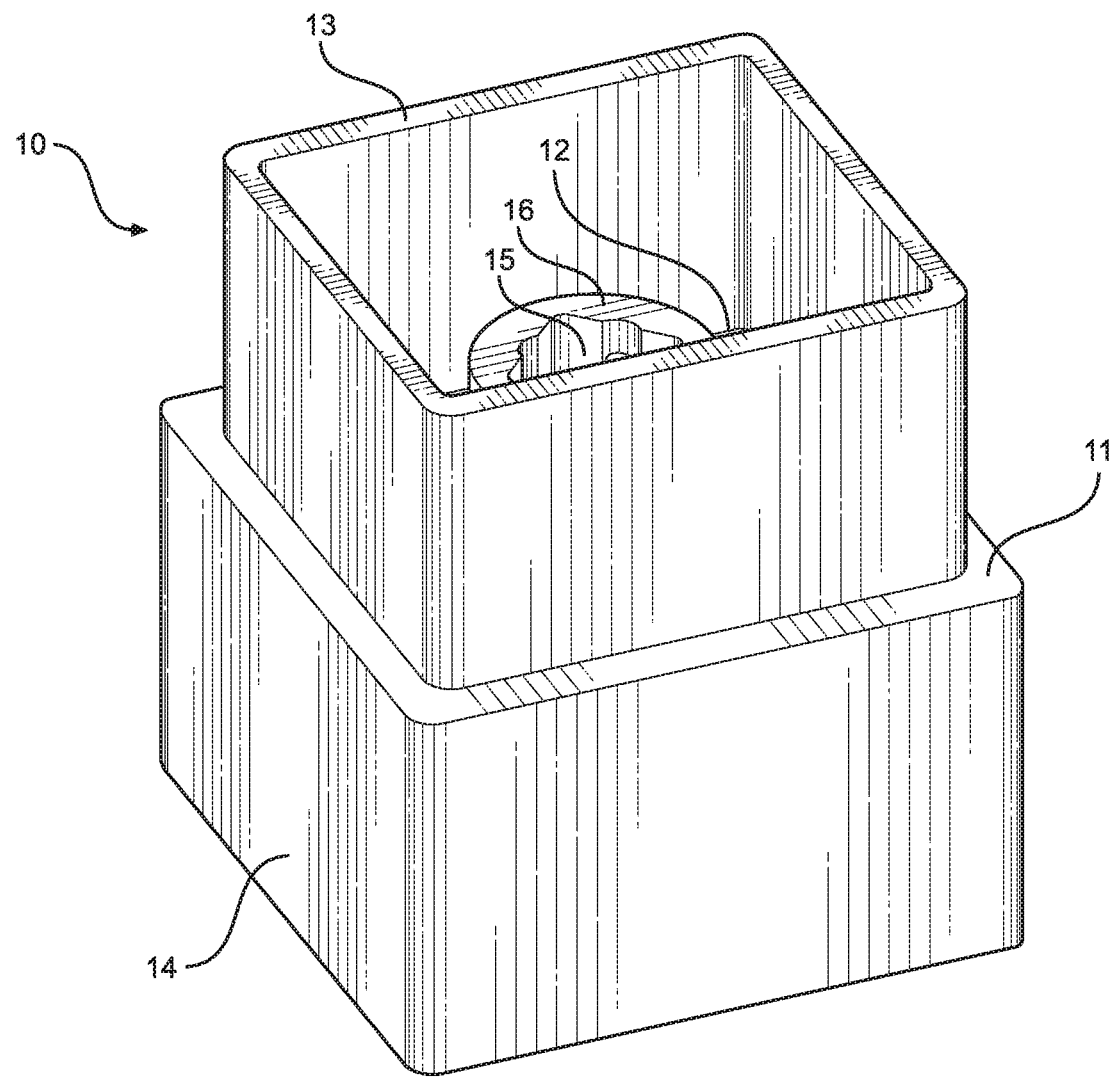
FIG. 1 shows a perspective view of an embodiment of the sewer cap removal socket.

Reference is made herein to the attached drawings. Like reference numerals are used throughout the drawings to depict like or similar elements of the sewer cap removal socket. The figures are intended for representative purposes only and should not be considered to be limiting in any respect.

Referring now to FIG. 1, there is shown a perspective view of an embodiment of the sewer cap removal socket. The sewer cap removal socket 10 comprises a base plate 11. The base plate 11 has a first side 12 and a second side. The second side is disposed oppositely of the first side 12. The base plate 11 is made of a durable material, such that pressure can be applied to the base plate 11 without the form or the shape of the base plate 11 being altered thereby. Additionally, the base plate 11 is planar, such that the sewer cap removal socket 10 can be engaged with a flat sewer cap.

An upper wall 13 extends upwardly from the first side 12 of the base plate 11. The upper wall 13 defines a first interface. In the illustrated embodiment, the upper wall 13 comprises four sides forming a substantially square-like shape. Specifically, the corners of the square-like shape are rounded, such that the upper wall 13 can engage a traditionally shaped sewer cap. The upper wall 13 is made of a durable material, such that pressure can be applied to the upper wall 13 without the form or the shape of the upper wall 13 being altered.

A lower wall 14 extends downwardly from the second side of the base plate 11. The lower wall 14 defines a second interface. The lower wall 14 extends from the base plate 11 in an opposite direction of the upper wall 13. In the illustrated embodiment, the lower wall 14 comprises four sides forming a substantially square-like shape. The corners of the square-like shape are rounded, such that the lower wall 14 can engage a traditionally shaped sewer cap. This shape, as illustrated, is identical in form to the shape of the upper wall 13, but is of a larger size, such that the sewer cap removal socket 10 can be utilized to remove two differently sized sewer caps. In other embodiments, the lower wall 14 is of an identical size to the upper wall 13 or of a smaller size than the upper wall 13. The lower wall 14 is made of a durable material, such that pressure can be applied to the lower wall 14 without the form or the shape of the lower wall 14 being altered.

An aperture 15 is disposed through the base plate 11. In the illustrated embodiment, the aperture 15 is centrally disposed through the base plate 11, such that pressure applied to the aperture 15 is substantially equally exerted upon the perimeter of the base plate 11, and further the upper wall 13 and the lower wall 14. As such, the torque applied by either the upper wall 13 or the lower wall 14 is maximized. In the illustrated embodiment, the aperture 15 comprises a socket interface 16. The socket interface 16 is configured to be engaged by a socket wrench to allow the user to more easily engage the sewer cap removal socket 10 with a sewer cap.

Figure 2:
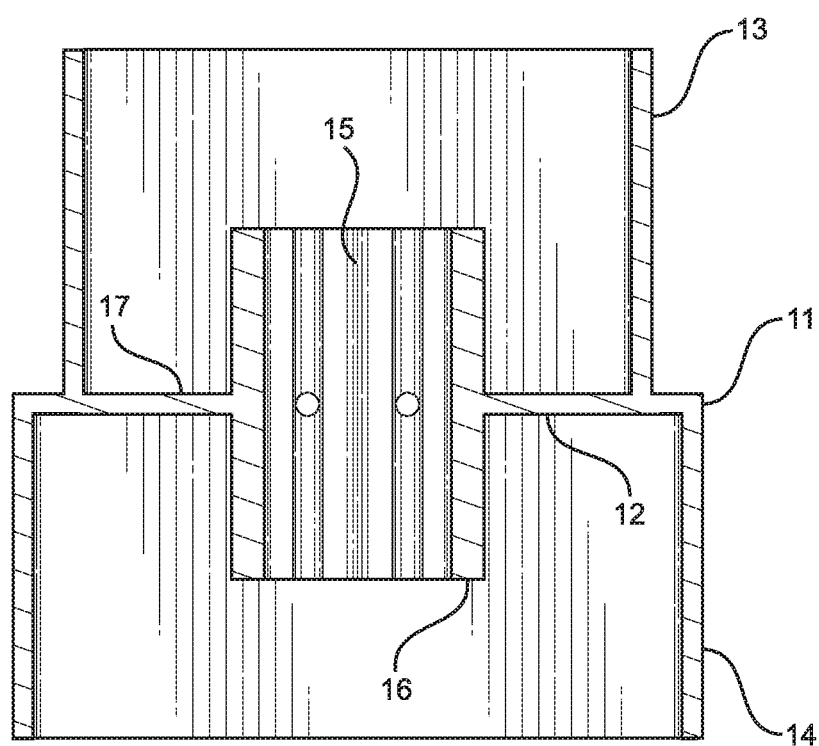
FIG. 2 shows a cross-sectional side view of an embodiment of the sewer cap removal socket.

Referring now to FIG. 2, there is shown a cross-sectional side view of an embodiment of the sewer cap removal socket. In one embodiment, a socket 16 is integrally disposed in the aperture 15 of the base plate 11. The socket 16 is dimensioned to receive a socket wrench. Additionally, the socket 16 may be configured to receive a breaker bar. As such, the range at which the user can engage the socket 16 with a socket wrench is increased.

In one embodiment, the base plate 11, upper wall 13 and lower wall 14 are constructed from aluminum. As such, the sewer cap removal socket 10 will be light weight, yet durable in construction. It is also contemplated, however, that the sewer cap removal socket 10 can be made of any suitable material for the contemplated purpose. This extends to other materials, such as other metals, hard plastics, carbon compounds, and the like. In additional embodiments, the base plate 11, upper wall 13 and lower wall 14 are powder coated. As such additional protection to the underlying material is provided, as well as allowing for identification, via color of the sewer cap removal socket 10. For example, the sewer cap removal socket 10 may be powder-coated in a green color, such as to designate the sewer cap removal socket 10 for use with sewer caps.

Figure 3A:
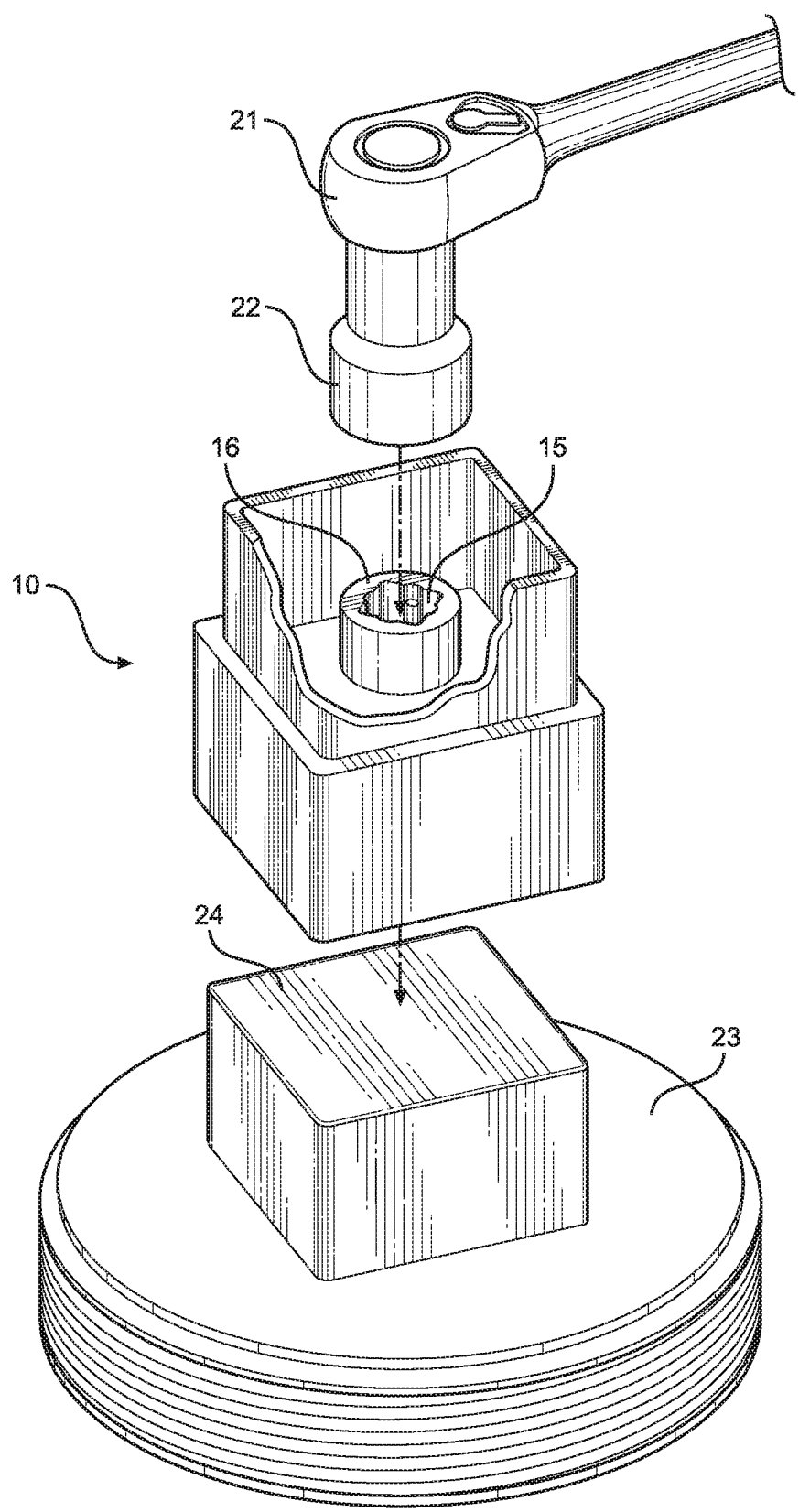
FIG. 3A shows a perspective view of an embodiment of the sewer cap removal socket in use.
Figure 3B:
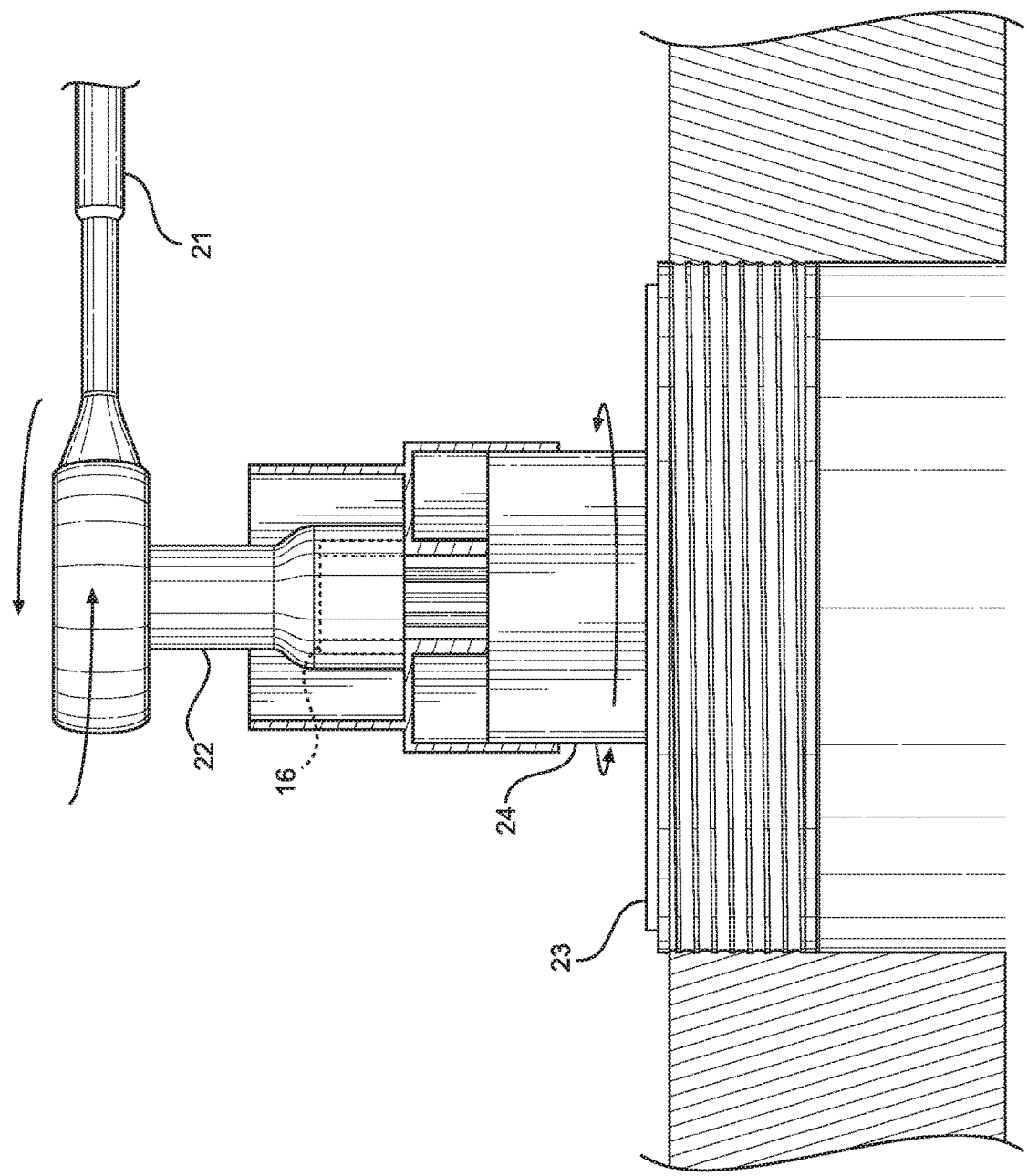
FIG. 3B shows a perspective view of an embodiment of the sewer cap removal socket in use.

Referring now to FIGS. 3A and 3B, there are shown a perspective view of an embodiment of the sewer cap removal socket in use. In use, the sewer cap removal device 10 is engaged with a sewer cap 23. The sewer cap removal device 10 is engaged with the sewer cap 23 via either the first interface or the second interface. As shown, the first interface and the second interface can be engaged with the sewer cap interface 24, thus allowing rotation and removal of the sewer cap 23. In the illustrated embodiment, a socket tool, such as a socket wrench 21 or a breaker bar 22 is engaged with the socket 16 of the sewer cap removal device 10. Rotation of the socket 16 of the sewer cap removal device 10 via the socket tool will, in turn, cause rotation of the sewer cap 23. Eventually, the sewer cap 23 will be loosened and removed. Additionally, by rotating the socket in the opposite direction, the sewer cap 23 can be tightened.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sewer cap removal socket, comprising:
   a base plate having a first side and a second side;
   an upper wall extending from the first side of the base plate;
   the upper wall defining a first interface;
   a lower wall extending from the second side of the base plate;
   the lower wall defining a second interface;
   an aperture disposed in the base plate;
   wherein the aperture comprises a socket integrally disposed therein.

2. The sewer cap removal socket of claim 1, wherein the aperture comprises a socket interface dimensioned to receive a socket wrench.

3. The sewer cap removal socket of claim 1, wherein the aperture comprises an interface dimensioned to receive a breaker bar.

4. The sewer cap removal socket of claim 1, wherein the upper wall defines a larger perimeter than the lower wall.

5. The sewer cap removal socket of claim 1, wherein the upper wall defines a smaller perimeter than the lower wall.

6. The sewer cap removal socket of claim 1, wherein the upper wall and the lower wall are each of a square shape having rounded corners.

7. The sewer cap removal socket of claim 1, wherein the base plate, upper wall and lower wall are made of aluminum.

8. The sewer cap removal socket of claim 1, wherein the base plate, upper wall and lower wall are powder coated.

9. A sewer cap removal socket, comprising:
   a base plate having a first side and a second side;
   an upper wall extending from the first side of the base plate;
   a lower wall extending from the second side of the base plate;
   an aperture disposed in the base plate;

a socket integrally and centrally disposed in the aperture;
wherein the upper wall defines a first interface corresponding to a first sewer cap size;
wherein the lower wall defines a second interface corresponding to a second sewer cap size;
wherein the upper wall and the lower wall are each of a square shape having rounded corners.

10. The sewer cap removal socket of claim 9, wherein the base plate, upper wall and lower wall are made of aluminum.

11. The sewer cap removal socket of claim 9, wherein the base plate, upper wall and lower wall are powder coated.

12. A method of removing a sewer cap, comprising:
providing a sewer cap removal device, comprising a base plate having a first side and a second side, an upper wall extending from the first side of the base plate, a lower wall extending from the second side of the base plate, an aperture disposed in the base plate, a socket integrally disposed in the aperture, wherein the upper wall defines a first interface corresponding to a first sewer cap size, wherein the lower wall defines a second interface corresponding to a second sewer cap size, wherein the upper wall and the lower wall are each of a square shape having rounded corners;
engaging a sewer cap with one of the first interface or the second interface;
engaging the socket with a socket tool;
rotating the socket with the socket tool in a direction to loosen and remove the sewer cap.

13. The method of removing a sewer cap of claim 12, wherein the socket tool is a socket wrench.

14. The method of removing a sewer cap of claim 12, wherein the socket tool is a breaker bar.

\* \* \* \* \*